(No Model.)

F. T. WILLIAMS & J. C. HOWELL.
MANUFACTURE OF SPONGY LEAD.

No. 296,262. Patented Apr. 1, 1884.

WITNESSES
E. A. Finckel
Ernest C. Webb

INVENTORS
Frank Franklyn Williams
John Charles Howell
by Atty. Wm. H. Finckel

N. PETERS. Photo-Lithographer. Washington, D. C.

UNITED STATES PATENT OFFICE.

FRANK TAMBLYN WILLIAMS AND JOHN CHARLES HOWELL, OF LLANELLY, COUNTY OF CARMARTHEN, ENGLAND.

MANUFACTURE OF SPONGY LEAD.

SPECIFICATION forming part of Letters Patent No. 296,262, dated April 1, 1884.

Application filed November 12, 1883. (No model.) Patented in England May 23, 1883, No. 2,573; in France November 6, 1883, No. 158,403, and in Belgium November 7, 1883, No. 63,133.

*To all whom it may concern:*

Be it known that we, FRANK TAMBLYN WILLIAMS and JOHN CHARLES HOWELL, both subjects of Her Majesty the Queen of Great Britain, residing at Llanelly, in the county of Carmarthen, South Wales, have invented certain new and useful improvements in the manufacture of porous or spongy plates or blocks, particularly applicable for use in secondary batteries or accumulators, and also for other purposes; and we do hereby declare that the following is a full, clear, and exact description of the invention, which will enable others skilled in the art to which it appertains to make and use the same.

This invention relates to the manufacture of porous or spongy lead or alloys of lead particularly adapted for use in secondary batteries or accumulators, but applicable also for use in the manufacture of white lead and for other purposes.

The invention consists in manufacturing or treating the lead or its alloy in the manner hereinafter described, by which blocks and plates of any predetermined size and shape may be obtained. When lead or any suitable alloy of lead and other metal is melted and allowed to crystallize slowly, highly-porous blocks or plates will be formed by simply inserting a suitably-perforated mold of about the size and pattern of the block or plate required into the mixture of molten lead and crystals of lead, then raising said mold out of the bath and allowing the liquid lead to drain through the mold. While the crystalline or porous block or plate thus formed in the mold is still hot, the upper surface may be leveled by passing a suitable piece of iron or other material over the surface. The crystalline or porous block or plate is then allowed to cool in the mold, and can be removed when required. The edges of the block or plate may be trimmed, if required, by means of a circular saw, and it is then ready for use.

Figure 1:
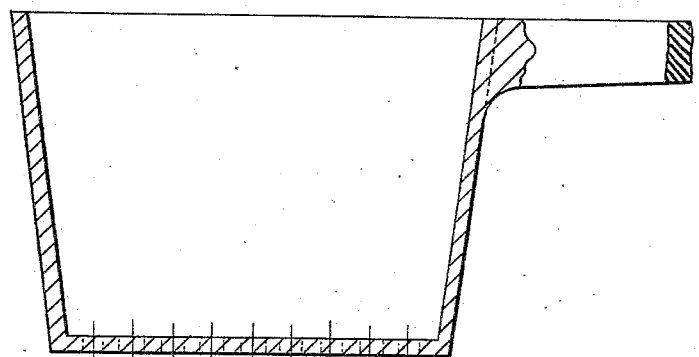
Figure 2:
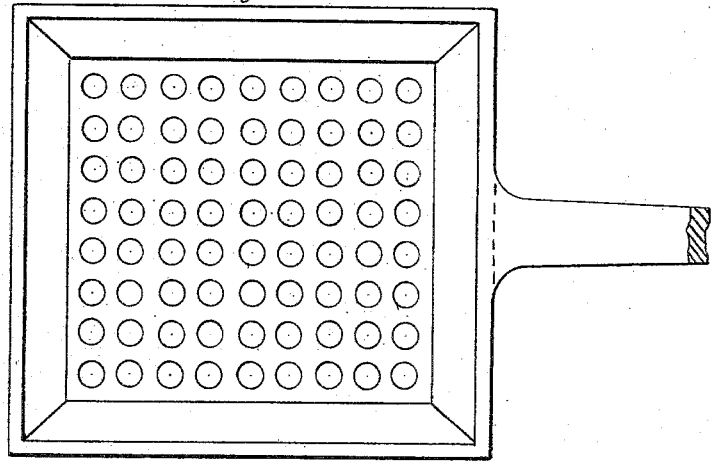

For the preparation of plates suitable for electrical storage batteries or accumulators, we prefer the following method—that is to say, we manufacture blocks of porous or spongy lead of any suitable size, which we subsequently cut into plates in the following manner: Into the before-described mixture of lead and crystalline lead, alloyed or otherwise, we insert a suitable ladle or mold, preferably of an oblong or square shape, with more or less taper in the sides, and having a suitably-perforated bottom. The form of ladle or mold shown in the accompanying drawings we have found by experiment will answer well, Figure 1 representing a sectional elevation, and Fig. 2 a bottom view, showing the perforations. The ladle or mold, when sufficiently filled with the said mixture, is raised, so as to allow the liquid metal to drain through the perforated bottom, leaving the ladle or mold more or less filled by a block of crystalline porous or spongy lead. When this block has sufficiently cooled, it is removed, and is then ready to be cut into plates of any desired size, preferably by means of a properly-arranged circular saw; but other suitable cutting arrangements may be employed. If the said blocks of porous or spongy lead are exposed to the action of a more or less damp atmosphere, they become oxidized to a considerable extent, thus materially assisting in what is known as the "forming" process of the plates. In order to enhance the durability of the said porous or spongy plates when in use, we compress in a mold or die, by hydraulic or other means, the edges and portions of the body of the said plates. The indentations thus formed we may subsequently paint or cover over with any suitable non-conducting material capable of resisting the action of the electrolyte; but we do not claim the painting or partial covering over of the plates as a part of our invention.

Figure 3:
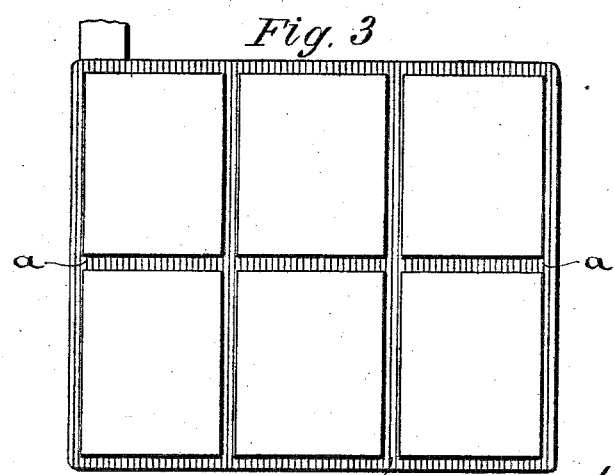

In Fig. 3 is represented a plan of a plate compressed as above described, the lines of compression being marked *a a a*. We do not confine ourselves to the manufacture of plates of any particular degree of porosity. Such porosity can be varied by the addition to the lead of a greater or less percentage of any metal capable of forming a suitable alloy therewith, antimony being particularly applicable. We adopt the principle above described in the manufacture of porous blocks to the manufacture of porous plates or disks for the purpose of being converted into white lead, these plates or disks taking the place of the lead crates such as are used for conversion into white lead by the processes now in general use. The said plates or disks are obtained by inserting a suitably perforated ladle or mold into a mixture of lead and crystallized lead of the required purity. The ladle or mold containing the porous plate or disk is then removed and allowed to cool. The plate or disk is detached, and is ready for use.

We are aware that it has been before proposed to use antimony in conjunction with lead for the manufacture of plates for secondary batteries, and we do not claim such admixture.

We are also aware that, in the separation of lead and silver, perforated ladles have been used, but not in the manner or for the purpose which we describe; and What we therefore claim, and desire to secure by Letters Patent, is—

The method of making porous blocks or plates of lead or alloy of lead, consisting in inserting a perforated mold of the size and pattern of the block or plate required into a bath of the crystallized and molten metal, then removing said mold from the bath and allowing the liquid metal to drain through the perforations, leaving in the mold a plate or block of crystalline porous or spongy metal, substantially as and for the purposes described.

FRANK TAMBLYN WILLIAMS.
JOHN CHARLES HOWELL.

Witnesses:
PHILIP M. JUSTICE,
ALLEN PARRY JONES.